United States Patent [19]
Yoshida

[11] Patent Number: 4,974,958
[45] Date of Patent: Dec. 4, 1990

[54] PROJECTING OPTICAL APPARATUS HAVING NO TRAPEZOIDAL DISTORTION

[75] Inventor: Kazushi Yoshida, Tokyo, Japan

[73] Assignee: Asahi Kogaku Kogyo Kabushiki Kaisha, Tokyo, Japan

[21] Appl. No.: 378,122

[22] Filed: Jul. 11, 1989

[30] Foreign Application Priority Data

Jul. 11, 1988 [JP] Japan ................................ 63-172371

[51] Int. Cl.⁵ .............................................. G03B 21/00
[52] U.S. Cl. ........................................ 353/66; 353/69; 353/101
[58] Field of Search ....................... 353/66, 67, 69, 70, 353/DIG. 3, DIG. 4, DIG. 6, 100, 101

[56] References Cited

U.S. PATENT DOCUMENTS

| | | | |
|---|---|---|---|
| 3,547,530 | 12/1970 | Poole | 353/70 |
| 4,002,408 | 1/1977 | Amma | 353/70 |
| 4,846,570 | 7/1989 | Kanai | 353/70 X |

FOREIGN PATENT DOCUMENTS 55-18891 5/1980 Japan .
63-198028 8/1988 Japan .

Primary Examiner—Harry N. Haroian
Attorney, Agent, or Firm—Sandler, Greenblum & Bernstein

[57] ABSTRACT

A projecting optical apparatus has a light source which is located above a document supporting plate to illuminate a document located on the document supporting plate. A projecting lens system is located above the document supporting plate to project an image of the document on a projection screen. A reflection mirror reflects the light transmitted through the projecting lens system toward the projection screen to make an image on the projection screen. The projecting lens system and the reflection mirror are incorporated in a projecting reflection unit, so that the projecting reflection unit is movable in directions substantially parallel with the plane of the document supporting plate.

18 Claims, 7 Drawing Sheets

PROJECTING OPTICAL APPARATUS HAVING NO TRAPEZOIDAL DISTORTION

BACKGROUND OF THE INVENTION

1. Field of the Invention

The present invention relates to a projecting optical apparatus which is used in an over-head projector or a similar apparatus, and more precisely it relates to a projecting optical apparatus in which no trapezoidal distortion is produced when the projecting position (height) is changed.

2. Description of Related Art

FIGS. 6 through 8 show a known over-head projector which will be referred to as OHP hereinafter. In FIGS. 6–8, a light source 12 and a projecting lens system 13 are arranged side by side above a document supporting plate 11 which lies in a substantially horizontal plane, so that the optical axis X of the projecting lens system 13 is normal to the plane of the document supporting plate 11. Above the projecting lens system 13 an inclined reflection mirror 14 is located and has an adjustable inclination angle. Light emitted from the light source 12 is incident upon a document (paper etc.) O on the document supporting plate 11, so that the light reflected by the document O is converged onto a projection screen 15 which lies in a plane perpendicular to the document supporting plane 11 through the projecting lens system 13 and the reflection mirror 14 to make an image on the projection screen 15.

In the OHP mentioned above, the (height position) of an image on the projection screen 15 can be adjusted by controlling the inclination angle of the reflection mirror 14.

In an arrangement shown in FIG. 6, the reflection mirror 14 is inclined at an inclination angle of 45° with respect to the document supporting plate 11 and the projection screen 15, so that the optical axis X of the light transmitted through the projecting lens system 13 and reflected by the reflection mirror 14 is normal to the projection screen 15.

FIG. 7 shows a different position of the reflection mirror 14, in which the reflection mirror 14 is rotated by an angle of 10° from a position shown in FIG. 6 in the counterclockwise direction, so that the light transmitted through the projecting lens system 13 along the optical axis X thereof and reflected by the reflection mirror 14 makes an angle (angle of elevation) of 20° with respect to a line normal to the plane of the projection screen 15.

In the conventional OHP, no trapezoidal distortion of an image O' (which is represented by a grid-like pattern for simplification in FIG. 8) of the document O, as shown by a dotted line in FIG. 8 is produced in a horizontal projection position shown in FIG. 6. However, at an angle of elevation of 20° shown in FIG. 7, a trapezoidal distortion is produced as shown by a solid line in FIG. 8. The trapezoidal distortion increases as the angle of elevation increases. Furthermore, when an image projected on the projection screen has a trapezoidal distortion, not only is the image wholly distorted into a trapezoidal shape, but the light is focused only at one point (focal point) in the vertical direction in FIG. 8. Namely, the image is out of focus.

In actual use of the OHP, the projection state having an angle of elevation as shown in FIG. 7 often occurs rather than the horizontal projection state as shown in FIG. 6. Thus, an image (picture) on the projection screen is viewed at an angle of elevation. Consequently, a viewer looks at an image which is wholly out-of-focus.

SUMMARY OF THE INVENTION

The primary object of the present invention is therefor to provide a projecting optical apparatus in which no trapezoidal distortion is produced even when the (height position) of projection is varied.

As mentioned above the trapezoidal distortion is caused by a change in the angle of elevation which is, in turn caused by a change in the inclination angle of the reflection mirror. Accordingly, the present invention proposes a projecting optical apparatus in which the height position of the projection can be adjusted without changing the inclination angle of the reflection mirror, thus resulting in no trapezoidal distortion.

The projecting optical apparatus can be applied not only to a reflection type projecting optical system in which a reflected image of a document is projected on a projection screen, but also to a transmission type projecting optical system in which a transmission image of a document is projected on a projection screen.

To achieve the object mentioned above, according to one aspect of the present invention, a projecting optical apparatus is provided including a light source which is located above a document supporting plate to illuminate a document located on the document supporting plate. A projecting lens system is located above the document supporting plate to project an image of the document on a projection screen and a reflection mirror reflects the light transmitted through the projecting lens system toward the projection screen to make an image on the projection screen. The improvement comprises a projecting reflection unit in which the projecting lens system and the reflection mirror are incorporated, so that the projecting reflection unit is movable in directions substantially parallel with a plane of the document supporting plate.

With this arrangement, the height position of projected image of the document on the projection screen can be adjusted by moving the projecting reflection unit without causing trapezoidal distortion.

Preferably, to make it possible for light reflected from the document on the document supporting plate to be effectively incident upon the projecting lens system, the light source is movable in directions substantially parallel with the plane of the document supporting plate, so that the light source and the projecting reflection unit are symmetrically moved toward and away from each other with respect to an imaginary center of the document supporting plate.

According to another aspect of the present invention, there is provided a projecting optical apparatus comprising a light source which is located below a transmission type of document supporting plate to illuminate a document located on the document supporting plate. A projecting lens system is located above the document supporting plate to project an image of document onto a projection screen. A reflection mirror reflects the light transmitted through the projecting lens system toward the projection screen to make an image on the projection screen. The improvement comprises a projecting reflection unit in which the projecting lens system and the reflection mirror are incorporated, so that the projecting reflection unit is movable in directions substantially parallel with a plane of the document supporting plate.

A difference between the reflection type and the transmission type resides only in the location of the light source. Namely, the light source is located on the same side and on opposite sides of the projecting lens system with respect to the document supporting plate in the reflection type projector and the transmission type projector, respectively.

Accordingly, in a transmission type projector, to make it possible for light reflected from the document on the document supporting plate to be effectively incident upon the projecting lens system, the light source is movable in directions substantially parallel with the plane of the document supporting plate. Thus, the light source and the projecting reflection unit are symmetrically moved towards and away from each other with respect to an imaginary center of the document supporting plate.

BRIEF DESCRIPTION OF THE DRAWINGS

The invention will be described below in detail with reference to the accompanying drawings, in which.

DETAILED DESCRIPTION OF PREFERRED EMBODIMENTS

Figure 1:
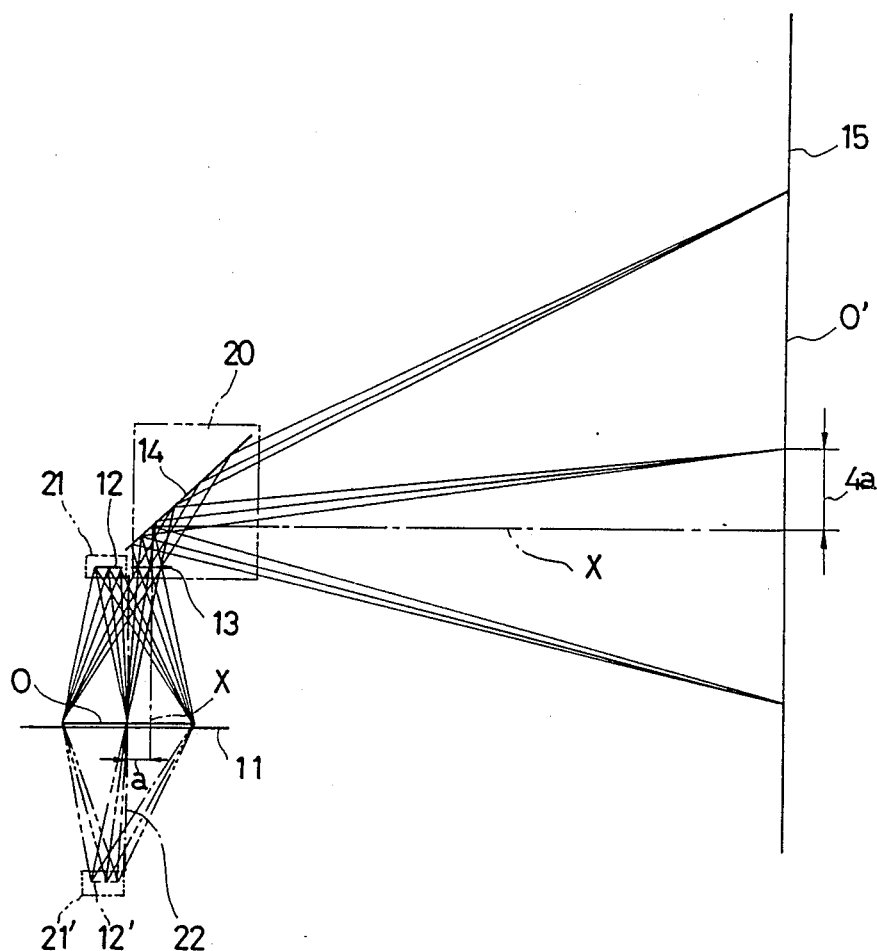
FIG. 1 is a view showing an optical path of a projecting optical apparatus according to the present invention.
Figure 2:
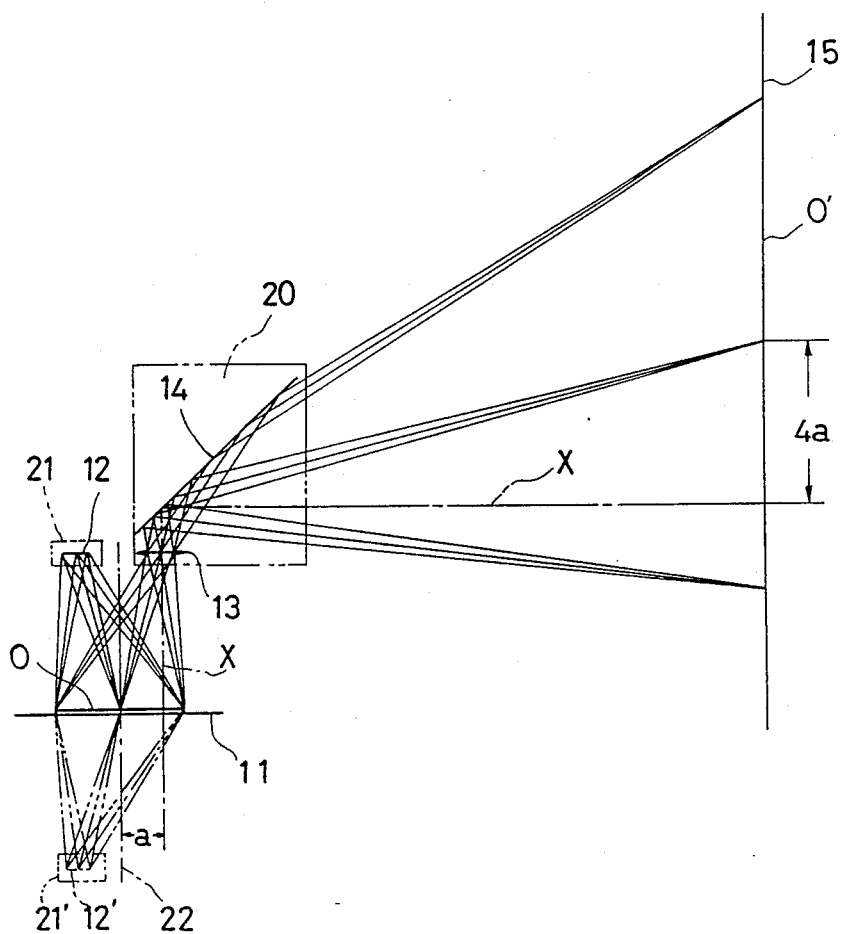
FIG. 2 is a view similar to FIG. 1, but shown at a different height position of an image on a projection screen.
Figure 3:
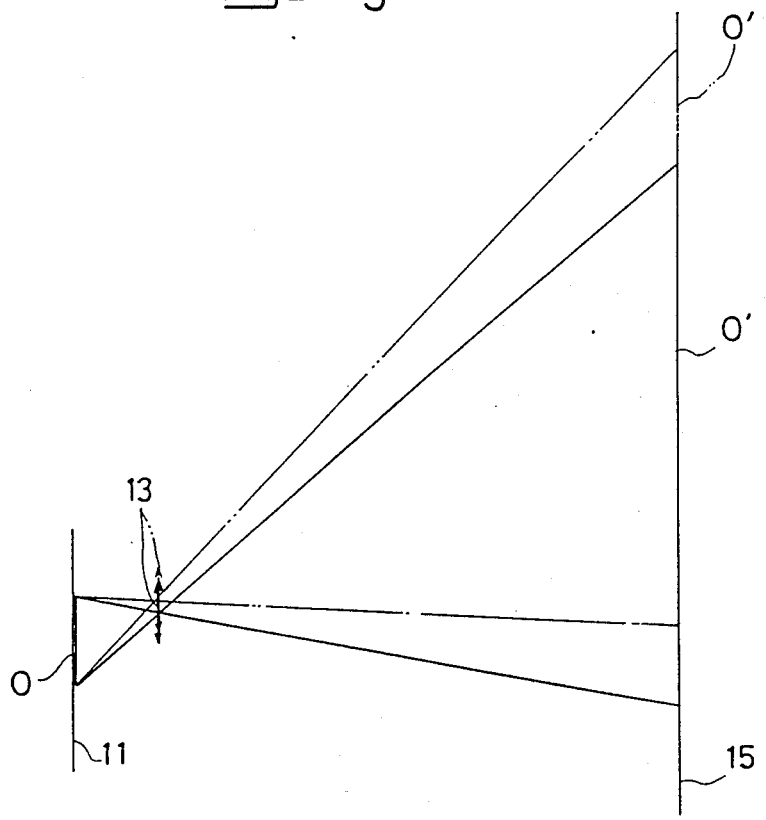
FIG. 3 is a view of an optical path for explaining how to prevent the occurrence of trapezoidal distortion, according to the present invention.

FIGS. 1 through 3 show a principle of a projecting optical apparatus according to an embodiment of the present invention.

Figure 6:
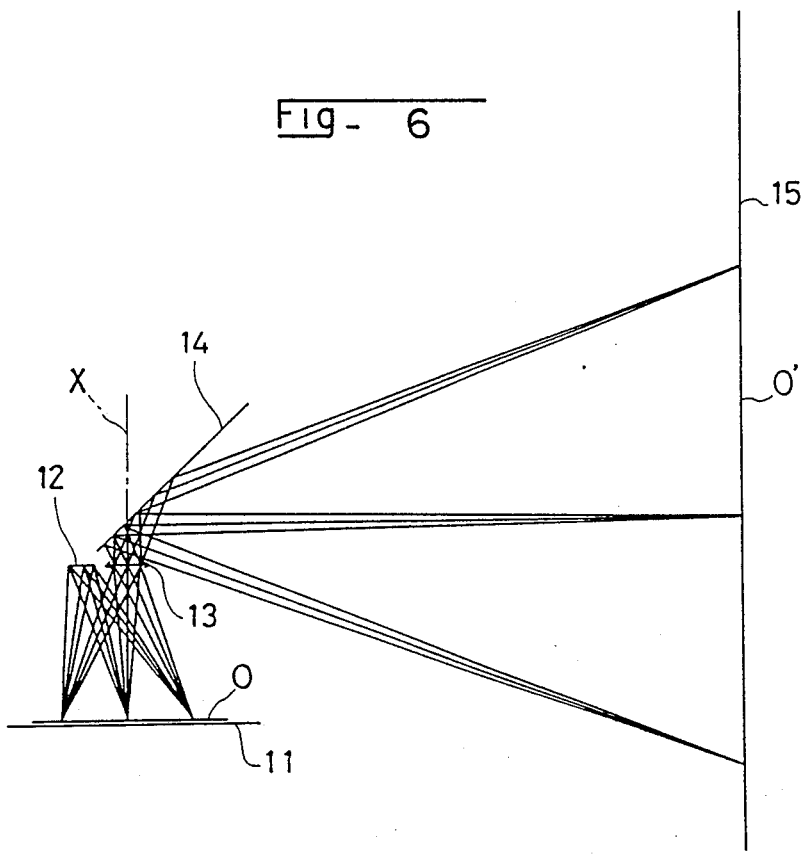
FIGS. 6 and 7 are views of optical paths of a known over-head projector.
Figure 7:
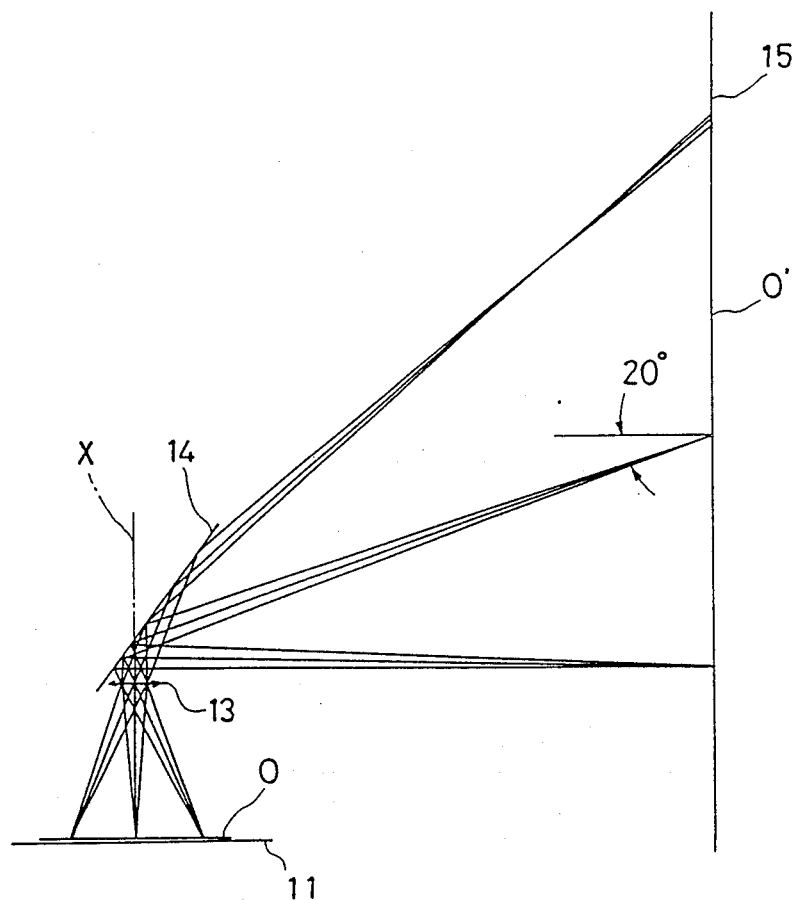
Figure 8:
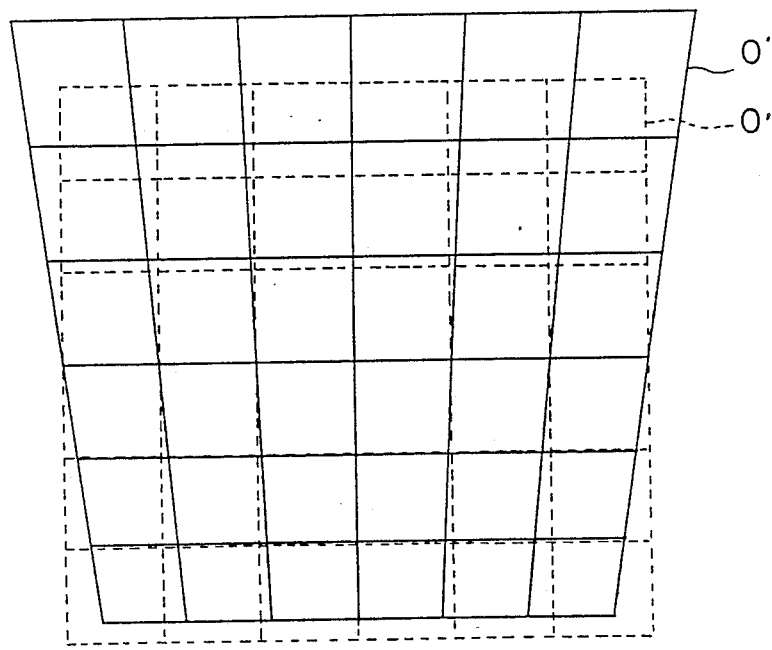
FIG. 8 is a schematic view showing a trapezoidal distortion which occurs in a conventional over-head projector.

The internal construction of the document supporting plate 11, the light source 12, the projecting lens system 13, the reflection mirror 14 and the projection screen 15 are same as those shown in FIG. 6. In the present invention, the projecting lens system 13 and the reflection mirror 14 are incorporated together in a projecting reflection unit 20. The light source 12 is also incorporated in an illumination unit 21. Both the projecting reflection unit 20 and the illumination block 21 are movable in directions parallel with the plane of the document supporting plate 11. The projecting lens system 13 is supported in the projecting reflection unit 20 so that the optical axis X of the projecting lens system 13 is normal to the plane of the document supporting plate 11. The reflection mirror 14 is supported in the projecting reflection unit 20, so that the reflection mirror 14 is inclined at an inclination angle of 45° with respect to both the document supporting plate 11 and the projection screen 15.

The projecting reflection unit 20 and the illumination unit 21 is moved towards and away from each other. The movement of the projecting reflection unit 20 and the illumination unit 21 preferably takes place symmetrically with respect to an imaginary center line 22 of the projecting reflection unit 20 and the illumination unit 21, perpendicular to the plane of the document supporting plate 11.

When the projecting reflection unit 20 and the illumination unit 21 move towards and away from each other, the projection position (height) of an image on the projection screen 15 is changed. When the height is adjusted, no trapezoidal distortion takes place, since the inclination angle of the reflection mirror 14 does not change.

In FIGS. 1 and 2, the distance between the projecting lens system 13 and the projection screen 15 is four times the distance between the document supporting plate 11 and the projecting lens system 13, so that an image 0' of the document 0 projected on the projection screen 15 is enlarged by four times. When the projecting reflection unit 20 and the illumination unit 21 are moved in directions parallel with the plane of the document 0 while maintaining a symmetrical positional relationship with respect to the imaginary center line 22, the position of the image 0' of the document 0 projected on the projection screen 15 is changed by four times the displacement of the projecting reflection unit 20 (and the illumination unit 21), without causing a trapezoidal distortion. Thus, if the distance between the imaginary center line 22 on the document supporting plate 11 (center of the document 0) and the optical axis X of the projecting lens system 13 is a, the distance which is projected on the projection screen 15 is 4a.

The reason that the change of projection position causes no trapezoidal distortion in the present invention will be discussed below with reference to FIG. 3.

Supposing that no reflection mirror 14 is provided (for simplicity) it can be considered that upon adjustment, only the projecting lens system 13 is moved in the directions parallel with the plane of the document 0. The movement of the projecting lens system 13 varies the position of the image 0' of the document 0 on the projection screen 15. Since the image 0' of the document 0 on the projection screen 15 is formed in a plane including the projection screen 15, no trapezoidal distortion is produced.

Consequently, if a light source (illumination system) in which the light reflected from the document 0 on the document supporting plate 11 is always uniformly incident upon the projecting lens system 13, regardless of the position of the projecting reflection unit 20, the illumination unit 21 (light source 12) can be fixedly positioned. However, it is practical to move both the illumination unit 21 and the projecting reflection unit 20 symmetrically with respect to the imaginary center line 22 of the illumination unit 21 and the projecting reflection unit 20, since the light reflected from the document 0 is incident upon the projecting lens system 13.

Figure 4:
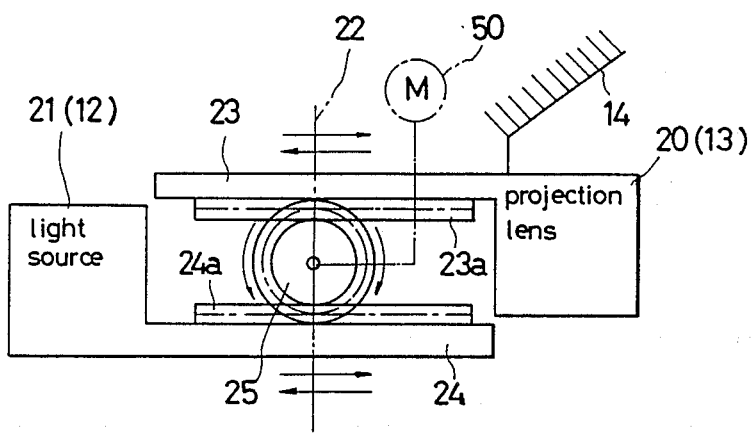
FIG. 4 is a front elevational view of a mechanism for symmetrically moving a projecting reflection unit and a light source unit, according to the present invention.

FIG. 4 shows a mechanism for moving the projecting reflection block 20 and the illumination unit 21 towards and away from each other, as an example. The projecting reflection unit 20 and the illumination unit 21 are supported by supports (not shown) so as to move in directions parallel with the plane of the document supporting plate 11. The projection reflecting unit 20 which has the projecting lens system 13 and the reflection mirror 14 has an arm 23 projecting therefrom in a direction parallel with the plane of the document supporting plate 11. On the other hand, the illumination unit 21 which has the light source 12 has a projection arm 24 which is opposed to and spaced from the arm 23 of the projecting reflection unit 20. The arms 23 and 24 have racks 23a and 24a which are opposed to each other and which are engaged by a single pinion 25 which is connected to a driving motor 50. Consequently, when the pinion 25 is rotated in the forward and reverse directions, the projecting reflection unit 20 and the illumination unit 21 move towards and away from and each other symmetrically with respect to the pinion 25 (and accordingly the center line 22).

Figure 5:
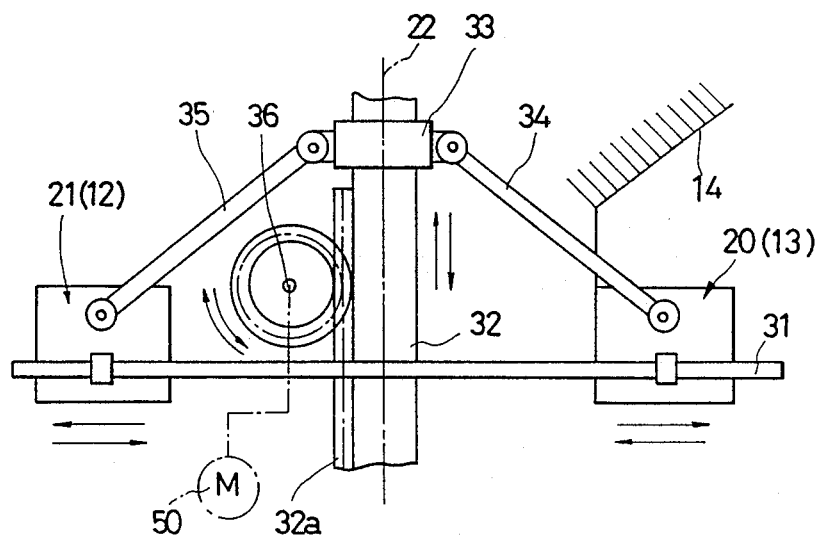
FIG. 5 is a view similar to FIG. 4, according to another embodiment of the present invention.

FIG. 5 shows another embodiment of a mechanism for moving the projecting reflection unit 20 and the illumination unit 21 to come away from and close to each other.

In FIG. 5, the projecting reflection unit 20 and the illumination unit 21 are movably supported by a horizontal guide bar 31 which extends in parallel with the plane of the document supporting plate 11 and which is located above the document supporting plate 11.

A drive shaft 32 is provided on the document supporting plate 11 so as to move up and down in directions perpendicular to the horizontal guide bar 31. The drive shaft 32 has a link supporting ring 33 secured thereto which has identical links 34 and 35 pivoted to the link supporting ring 33. The opposite ends of the links 34 and 35 are pivotedly connected to the projecting reflection unit 20 and the illumination unit 21, respectively. The drive shaft 32 has a rack 32a which is engaged by a pinion 36 connected to a driving motor 50, so that when the pinion 36 is rotated in forward and reverse directions, the drive shaft 32 is moved up and down in the directions perpendicular to the horizontal guide bar 31 through the rack 32a. The movement of the drive shaft 32 causes the projecting reflection unit 20 and the illumination unit 21 to move toward and away from each other symmetrically with respect to the drive shaft 32 (and accordingly the imaginary center line 22) through the links 34 and 35.

As can be understood from the foregoing, so long as the document supporting plate 11 is always kept to be perpendicular to the projection screen 15, it is theoretically possible to fix the inclination angle of the reflection mirror 14 to be 45° with respect to the document supporting plate 11 and the projection screen 15. However, in actual use, since the perpendicularity is not always guaranteed, it is preferable to support the reflection mirror 14 on the projecting reflection unit 20 so as to adjust the inclination angle thereof.

The above discussion has been directed to a reflection type projector in which the reflection image of the document is projected on the projection screen.

However, the present invention can be also applied to a transmission type projector (FIG. 1) in which a transmission image of the document O is projected on the projection screen 15. In such an application of the invention to a transmission type projector, the document supporting plate 11 is of transmission type, for example, made of a transparent material, so that the light can be transmitted through the document supporting plate 11. The light source 12' and accordingly, the illumination unit 21' are provided on the opposite side of the projecting lens system 13 with respect to the document supporting plate 11. The light source 12' and illumination unit 21' are shown by imaginary lines in FIGS. 1 and 2. In this arrangement for the transmission type projector, it is also preferable to move the projecting reflection unit 20 and the illumination unit 21 towards and away from each other symmetrically with respect to the imaginary center line 22, similarly to the first mentioned embodiment.

It is preferable to vary the direction of the illumination light (incident light) in accordance with the distance between the light source 12 (12') of the illumination block 21 (21') and the projecting reflection block 20, as shown in FIGS. 1 and 2.

As can be seen from the above discussion, according to the present invention, the projection position of an image on the projection screen can be adjusted by the movement of the projecting reflection unit which contains the projecting lens system and the reflection mirror above the document supporting plate without producing a trapezoidal distortion. Therefore, the projecting optical apparatus according to the present invention can be particularly advantageously used for an overhead projector in which the height position of projection must be changed in accordance with circumstances. Thus, a clearly projected picture with no trapezoidal distortion can be obtained.

I claim:

1. A projecting optical apparatus comprising a light source which is located above a document supporting plate to illuminate a document located on the document supporting plate, a projecting lens system which is located above the document supporting plate to project an image of the document on a projection screen and a reflection mirror which reflects the light transmitted through the projecting lens system toward the projection screen to make an image on the projection screen, a projecting reflection unit in which said projecting lens system and said reflection mirror are incorporated, and means mounting said projecting reflection unit and said light source for movement symmetrically with respect to an imaginary center line normal to said document supporting plate and in directions substantially parallel with a plane of the document supporting plate.

2. A projecting optical apparatus according to claim 1, further comprising an illumination block which supports the light source and which is movable in directions substantially parallel with the plane of the document supporting plate.

3. A projecting optical apparatus according to claim 2, wherein said projecting reflection unit and said illumination block move towards and away from each other symmetrically with respect to an imaginary center line which is normal to the document supporting plate.

4. A projecting optical apparatus according to claim 3, further comprising a mechanism for moving said projecting reflection unit and said illumination block.

5. A projecting optical apparatus according to claim 4, wherein said mechanism comprises racks which are provided on said projection reflection unit and said illumination block and which are opposed to each other, and a pinion which is engaged by said racks to move said projecting reflection unit and said illumination block through said respective racks.

6. A projecting optical apparatus according to claim 4, wherein said mechanism comprises a drive shaft which is connected to the projecting reflection unit and the illumination block through pivotal links, and wherein said shaft is movable in directions perpendicular to the directions of the movement of said projecting reflection unit and said illumination block.

7. A projecting optical apparatus according to claim 6, wherein said drive shaft has a rack, and wherein said mechanism comprises a pinion which is engaged by said rack to move said drive shaft.

8. A projecting optical apparatus according to claim 1, wherein said reflection mirror is mounted to said projecting reflection unit at a predetermined inclination angle.

9. A projecting optical apparatus according to claim 8, wherein said inclination angle is adjustable.

10. A projecting optical apparatus according to claim 1, wherein said projection screen is substantially normal to a plane of said document supporting plate.

11. A projecting optical apparatus according to claim 10, wherein said reflection mirror is inclined at an inclination angle of 45° with respect to said document supporting plate and said projection screen.

12. A projecting optical apparatus comprising a light source which is located above a document supporting plate to illuminate a document located on said document supporting plate, a projecting lens system which is located above said document supporting plate to project an image of the document onto a projecting screen and a reflection mirror which reflects the light transmitted through said projecting lens system towards said projection screen to make an image on said projection screen, said projecting lens system and said light source being movable symmetrically with respect to an imaginary center line normal to said document supporting plate and in directions substantially parallel with the plane of said document supporting plate.

13. A projecting optical apparatus according to claim 12, wherein said reflection mirror is inclined at a fixed inclination angle with respect to said document supporting plate.

14. A projecting optical apparatus comprising a light source which is located below a transmission type of document supporting plate to illuminate a document located on said document supporting plate, a projecting lens system located above said document supporting plate to project an image of the document on a projection screen and a reflection mirror which reflects the light transmitted through said projecting lens system towards said projection screen to make an image on said projection screen, a projecting reflection unit in which said projecting lens system and said reflection mirror are incorporated, and means for mounting said projecting reflection unit and said light source so that said projecting reflection unit and said light source are movable symmetrically with respect to an imaginary center line normal to said document supporting plate and in directions substantially parallel with a plane of said document supporting plate.

15. A projecting optical apparatus according to claim 14, further comprising an illumination block which supports said light source and which is movable in directions substantially parallel with a plane of said document supporting plate.

16. A projecting optical apparatus according to claim 15, wherein said projecting reflection unit and said illumination block move towards and away from each other symmetrically with respect to an imaginary center line normal to said document supporting plate.

17. A projecting optical apparatus comprising a light source which is located below a transmission type document supporting plate to illuminate a document located on said document supporting plate, a projecting lens system which is located above said document supporting plate to project an image of the document on a projection screen and a reflection mirror which reflects the light transmitted through said projecting lens system toward said projection screen to make an image on said projection screen, said projecting lens system and said light source being movable symmetrically with respect to an imaginary center line normal to said document supporting plate and in directions substantially parallel with the plane of said document supporting plate.

18. A projecting optical apparatus according to claim 17, wherein said reflection mirror is inclined at a fixed inclination angle with respect to said document supporting plate.

* * * * *